United States Patent Office 2,719,857
Patented Oct. 4, 1955

2,719,857

BROMINATION OF STIGMASTADIENONE

Byron A. Johnson, Kalamazoo, and Maxton F. Murray and Robert A. Donia, Kalamazoo Township, Kalamazoo County, Mich., assignors to The Upjohn Company, Kalamazoo, Mich., a corporation of Michigan No Drawing. Application May 24, 1954,
Serial No. 432,024

13 Claims. (Cl. 260—397.2)

This invention relates to a novel bromination, more particularly to the bromination of stigmastadienone to produce 22,23-dibromo-4-stigmasten-3-one, and to a novel process for the isolation of the stigmastadienone from a steroid mixture.

It is an object of the present invention to provide a novel process for the production of 22,23-dibromo-4-stigmasten-3-one. Another object is the provision of a process for the separation of sito series steroids and 22,23-unsaturated steroid involving the bromination of stigmastadienone to produce 22,23-dibromo-4-stigmasten-3-one. A further object is the provision of a process for the production and isolation of stigmastadienone from a starting mixture of soysterols. Other objects will be apparent to those skilled in the art to which this invention pertains.

According to the present invention, stigmastadienone is brominated in the presence of an amine selected from the group consisting of pyridine and alkylpyridines to produce 22,23-dibromo-4-stigmasten-3-one.

22,23-dibromo-4-stigmasten-3-one is claimed in Fernholz and Stavely U. S. Patent 2,319,808, issued May 25, 1943. In that patent, 22,23-dibromo-4-stigmasten-3-one was prepared by the oxidation of stigmasterol 22,23-dibromide. The stigmasterol 22,23-dibromide was prepared from stigmasterol by acetylation to produce stigmasteryl acetate, bromination to produce stigmasteryl acetate tetrabromide, dehalogenation to produce stigmasteryl acetate 22,23-dibromide, followed by saponification to produce stigmasterol 22,23-dibromide.

When following the process of the present invention, 22,23-dibromo-4-stigmasten-3-one can be prepared from stigmasterol in two steps, i. e., oxidation of stigmasterol to stigmastadienone followed by bromination to produce 22,23-dibromo-4-stigmasten-3-one. The use of the two reactions of the present invention rather than the five reactions of Fernholz and Stavely to produce 22,23-dibromo-4-stigmasten-3-one is accompanied by the economies of a higher over-all yield from stigmasterol, the use of fewer and smaller amounts of reagents, and a more rapid conversion of stigmasterol to the desired brominated product.

The 22,23-dibromo-4-stigmasten-3-one has been disclosed by Fernholz and Stavely to be useful as an intermediate for the production of therapeutically important compounds of the steroid class, e. g., corpus luteum, adrenal and testis hormones. It has now been additionally found that 22,23-dibromo-4-stigmasten-3-one is useful in the separation of steroids of the 22,23-unsaturated series from a mixture with sito series steroids, as more fully disclosed hereinafter.

In carrying out the bromination step of the present invention, stigmastadienone is brominated with bromine in a suitable organic diluent, in the presence of pyridine or an alkyl pyridine, to produce 22,23-dibromo-4-stigmasten-3-one. A practical source of stigmastadienone is the mixture of $\Delta^4$-3-ketones obtained by the oxidation, e. g., with cyclohexanone and aluminum isopropoxide, of the soysterols obtained from the sterol fraction of soybean oil. This preferred starting steroid mixture usually consists of from about fifteen to about 35 percent stigmastadienone.

When the bromination is conducted on substantially pure stigmastadienone, although the amount of bromine necessary to achieve complete saturation of the side chain double bond theoretically is one molar equivalent, more than this amount is preferably used, e. g., about 1.5 molar equivalents. The use of about the theoretical molar equivalent of bromine results in a less than optimum yield of 22,23-dibromo-4-stigmasten-3-one.

When the mixture of $\Delta^4$-3-ketones obtained from the oxidation of soysterols is used as the starting steroid for the bromination, the amount of bromine required to obtain complete bromination of the side chain double bond of stigmastadienone is usually more than the theoretical one molar equivalent, e. g., about 1.5 molar equivalents, calculated on the stigmastadienone present in the mixture. The amount of bromine necessary, in excess of the theoretical amount, depends somewhat upon the reaction conditions and the composition of the other ingredients present in the starting mixture. Usually the amount of bromine employed will be between about 1.3 and about 1.7 molar equivalents calculated on the stigmastadienone present in the starting mixture, e. g., about 1.5 molar equivalents. Although the proportion of bromine employed exceeds the theoretical one molar equivalent, under the conditions of the present invention, the $\Delta^4$-3-keto group of stigmastadienone is substantially unaffected by the bromination.

The protection of the $\Delta^4$-3-keto system for the starting steroids or steroid is achieved according to this invention by conducting the bromination in the presence of pyridine or an alkylpyridine. Examples of alkylpyridines include the picolines, the lutidines, the gamma-collidines, the $\alpha,\beta$-collidines, conyrine, the parvulines, the parvolines, coridines, and other alkylpyridines wherein the alkyl substituents each contain from one to eight carbon atoms. The proportion of pyridine or alkylpyridine employed in the bromination may vary from a trace to several molar equivalents, preferably at least one molar equivalent, calculated on the stigmastadienone.

The bromination may be conducted at a temperature from about plus twenty degrees centigrade to any temperature below twenty degrees centigrade wherein all of the reactants are maintained in solution, e. g., minus seventy to plus twenty degrees centigrade. The preferred bromination temperature is between about minus ten and plus ten degrees centigrade, especially about zero degrees centigrade.

The organic diluents used in the bromination are those substantially inert solvents normally employed in a bromination, e. g., methylene chloride, chloroform, carbon tetrachloride, the saturated hydrocarbons, tertiary butyl alcohol, etc., or mixtures of these or like solvents. The steroid is ordinarily first dissolved in the reaction solvent containing pyridine or alkylpyridine, the solution cooled to the desired reaction temperature, preferably to about zero degrees centigrade, and the bromine then added.

The bromine is usually added dropwise at least until the bromine color persists and preferably until at least about 1.3 molar equivalents have been added. The reaction mixture is preferably stirred during the addition. The proportion of bromine required to obtain a persistent bromine color will depend upon the starting material to be brominated, as stated before. When a persistent bromine color is obtained in the reaction mixture, e. g., when the preferred excess of bromine has been added, the excess bromine may then be destroyed immediately, or the reaction mixture maintained preferably at a temperature of about zero degrees centigrade or colder, and the excess bromine destroyed later. The excess bromine causing the persistent bromine color can be readily destroyed with dilute aqueous sodium thiosulfate.

In working up the reaction product, the bromination mixture is preferably freed of excess bromine and the pyridine or alkylpyridine removed by washing with dilute aqueous acid. If a water miscible solvent was employed in the bromination, a water immiscible solvent may be added to produce an aqueous and organic phase. After washing the reaction product with, for example, sodium thiosulfate to remove any excess bromine, and with dilute acid to remove the pyridine, the organic phase may then be dried and the solvent removed to leave a solid steroid residue.

When the starting material for the bromination is stigmastadienone, the solid residue will consist essentially of 22,23-dibromo-4-stigmasten-3-one. When the starting material consists of a mixture of stigmastadienone and sitostenone, the reaction product will consist essentially of 22,23-dibromo-4-stigmasten-3-one and sitostenone which may be partially brominated. 22,23-dibromo-4-stigmasten-3-one can be separated from this latter mixture, e. g., by a countercurrent extraction as shown in the examples hereinafter.

Whereas stigmastadienone and sitostenone are difficult to separate from each other, the physical characteristics of 22,23-dibromo-4-stigmasten-3-one and the sitostenones are sufficiently different to permit their ready separation by, for example, countercurrent extraction. Other separation techniques, for example, chromatography, countercurrent batchwise fractional crystallization, and other techniques known in the art may also be employed.

22,23-dibromo-4-stigmasten-3-one can be re-converted to the useful stigmastadienone by reaction with a dehalogenation agent, e. g., zinc and acetic acid. The conversion of stigmastadienone to physiologically active steroids, e. g., progesterone, is known in the art.

A preferred aspect of the present invention therefore involves the steps of brominating a mixture consisting essentially of stigmastadienone and sitostenone to produce 22,23-dibromo-4-stigmasten-3-one and sitostenone, and then isolating the thus-produced 22,23-dibromo-4-stigmasten-3-one. An illustrative application of the present invention involves the oxidation of a mixture of soysterols to produce a mixture of $\Delta^4$-3-ketosteroids, which are then brominated without purification according to the process of the present invention to produce 22,23-dibromo-4-stigmasten-3-one and sitostenone, which are separated from each other. The thus isolated 22,23-dibromo-4-stigmasten-3-one is treated with a dehalogenating agent to produce the highly useful intermediate, stigmastadienone.

The following examples are illustrative of the process of the present invention but are not to be construed as limiting.

OXIDATION

Example 1.—Oxidation of stigmasterol

A stirred solution of 8.25 grams (0.020 mole) of stigmasterol and 15.7 grams of redistilled cyclohexanone in 250 milliliters of anhydrous toluene was refluxed in a dry atmosphere until fifty milliliters of distillate was collected. The mixture was then cooled slightly below the refluxing temperature and 2.04 grams (0.010 mole) of aluminum isopropoxide was added in one portion. Distillation was then resumed for 45 minutes, during which time eighty milliliters of distillate was collected. After the reaction mixture was cooled to sixty degrees, 100 milliliters of dilute sulfuric acid containing the equivalent of five milliliters of concentrated sulfuric acid was added and stirring was continued for five minutes. The aqueous layer was then separated and the cooled organic phase was washed with three 100-milliliter portions of water. The combined organic phases were then distilled until a clear distillate was obtained. This effected 3.6 liters of distillate obtained over a three hour period. The residue from the distillation was freed of water by decantation and then dissolved in 200 milliliters of methanol. The solution was concentrated to a volume of about 130 milliliters by distillation of the methanol and then refrigerated. The 6.40 grams, a yield of 78 percent of the theoretical, of stigmastadienone which precipitated had a melting point of 125 to 127 degrees centigrade, and $[\alpha]_D$ of plus 54 degrees, an E of 16,400 and a purity of 98.5 percent.

Example 2.—Oxidation of soysterols

A solution of 43.06 grams (0.104 mole) of soysterols assaying about eighteen percent stigmasterol and 102 grams (1.04 mole) of cyclohexanone in one liter of toluene was distilled in a dry atmosphere until 500 milliliters had distilled. To the distillation residue was added 12.2 grams (0.06 mole) of aluminum isopropoxide and the mixture refluxed for one hour. The resulting reaction product was then cooled to five degrees centigrade and 400 milliliters of 1.5 normal sulfuric acid was added, the mixture was shaken and the aqueous phase was then separated and extracted with two 100-milliliter portions of toluene. The toluene extracts were combined and washed with cold water and a cold one percent solution of sodium bicarbonate. The toluene extract was then steam distilled for one hour until all of the toluene had been volatilized. The distillation residue was cooled and the water was decanted from the solid. The solid was then dissolved in 200 milliliters of benzene and the solution was dried. The dried solution was freed of solvent by distillation and the residue was dissolved in ninety milliliters of hot denatured ethanol. The cooled solution precipitated, in two crops, totaling 31.3 grams, a yield of 72 percent of the theoretical, of soysteryl $\Delta^4$-3-ketones which showed no hydroxyl absorption upon infrared spectrum analysis.

Similarly, stigmastadienone, sitostenone and mixtures of the two can be prepared by oxidation of stigmasterol, sitosterol and soysterol, respectively, with other oxidizing agents, e. g., manganese dioxide, chromic acid, and aluminum isopropoxide and acetone or other ketone.

BROMINATION

Example 3.—Stigmastadienone 22,23-dibromide

A solution of one gram (2.46 millimoles) of stigmastadienone in fifty milliliters of methylene chloride was cooled to zero degrees centigrade and a solution of 0.3 milliliter (3.7 millimoles) of pyridine and 0.6 gram (3.8 millimoles) of bromine in five milliliters of methylene chloride was added dropwise thereto with stirring over a period of twenty minutes. The resulting mixture was stirred for an additional 160 minutes at zero degrees centigrade and then extracted with dilute hydrochloric acid followed by a wash with water all at close to zero degrees centigrade. The washed solution was then extracted twice with a four percent aqueous solution of sodium thiosulfate and the methylene chloride distilled therefrom at reduced pressure. The solid residue consisted essentially of an almost quantitative yield of stigmastadienone 22,23-dibromide (22,23-dibromo-4-stigmasten-3-one) having an $E_{242}$ of 15,925 (calculated, 16,500) and the analysis given below.

Calculated for $C_{29}H_{46}Br_2O$: Br, 28.02; Found, 28.57.

Example 4.—Stigmastadienone 22,23-dibromide

A solution of three grams (7.38 millimoles) of soysteryl $\Delta^4$-3-ketones assaying about 32 percent stigmastadienone (2.36 millimoles) in 145 milliliters of methylene chloride was cooled to zero degrees centigrade and a solution of 0.575 gram (3.7 millimoles) of bromine and 0.3 milliliter of pyridine in five milliliters of methylene chloride was added dropwise at that temperature over a period of 25 minutes. Stirring was continued for two and one-half hours at zero degrees centigrade. The mixture was then extracted with dilute hydrochloric acid, and washed with water and then sodium thiosulfate solution, all at about zero degrees centigrade. The methylene chloride solution was dried and the solvent distilled therefrom at reduced pressure leaving a residue having the analysis given below and an infrared spectrum indicating that the Δ⁴-3-keto group of the mixture was substantially unaffected by the bromination.

Calculated for 68 percent sitostenone and 32 percent 22,23-dibromo-4-stigmasten-3-one: Br, 11.01 percent. Found: Br, 10.90 percent.

SEPARATION

*Example 5.—With Craig extractor*

A Craig extractor [see L. C. Craig and D. Craig, "Technique of Organic Chemistry," vol. III, pages 171 to 311, New York Interscience Publishers (1950); L. C. Craig and O. Post, "Apparatus for countercurrent distribution," Analytical Chemistry, 21, 500 (1949); and L. C. Craig et al., "Automatic countercurrent distribution equipment," Analytical Chemistry, 23, 1236 (1951)] was employed with a capacity per tube of nine milliliters for the mobile solvent and thirteen milliliters for the stationary solvent. Dimethylformamide was employed as the stationary solvent and n-heptane was employed as the mobile solvent. The starting soysteryl Δ⁴-3-ketones consisted of about 68 percent sitostenone and about 32 molar percent 22,23-dibromo-4-stigmasten-3-one. A total of 135 transfers were made. Tubes 40 to 65 consisted essentially of 22,23-dibromo-4-stigmasten-3-one and tubes 85 to 110 consisted essentially of sitostenone.

Sitostenone and 22,23-dibromo-4-stigmasten-3-one can also be separated from each other by chromatography employing a column of activated carbon or other chromatography columns containing as adsorbing solids materials substantially inert to the steroids. The chromatography is preferably conducted under dry conditions employing solvents substantially non-reactive towards the steroids.

DEBROMINATION

*Example 6.—Debromination of 22,23-dibromo-4-stigmasten-3-one*

Stigmastadienone is produced in high yield by stirring 22,23-dibromo-4-stigmasten-3-one with zinc powder in a solvent of glacial acetic acid at about room temperature. Filtering off the inorganic solids and then flooding the filtrate mixture with water is productive of a precipitate of stigmastadienone. The stigmastadienone can then be isolated according to methods known in the art.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process for the production of 22,23-dibromo-4-stigmasten-3-one which comprises mixing a solution of stigmastadienone in an organic solvent with at least a molar equivalent of bromine, in the presence of an amine selected from the group consisting of pyridine and alkylpyridines, to produce 22,23-dibromo-4-stigmasten-3-one.

2. A process for the production of 22,23-dibromo-4-stigmasten-3-one which comprises mixing a solution of stigastadienone in an organic solvent with at least a molar equivalent of bromine, in the presence of pyridine, to produce 22,23-dibromo-4-stigmasten-3-one.

3. The process of claim 2 wherein the bromination is conducted at below about twenty degrees centigrade.

4. The process of claim 2 wherein the bromination is conducted employing at least one molar equivalent of pyridine.

5. A process for the production of 22,23-dibromo-4-stigmasten-3-one which comprises the steps of mixing a solution of stigmastadienone in an organic solvent with at least one molar equivalent of bromine at about zero degrees centigrade, in the presence of pyridine, to produce 22,23-dibromo-4-stigmasten-3-one and then removing the excess bromine.

6. The process of claim 5 wherein at least one molar equivalent of pyridine and between 1.3 and 1.5 molar equivalents of bromine are employed.

7. The process which comprises the steps of (1) brominating a steroid mixture consisting essentially of stigmastadienone and sitostenone with at least a molar equivalent of bromine, calculated on the stigmastadienone, in the presence of a compound selected from the group consisting of pyridine and alkylpyridines, to produce a steroid mixture consisting essentially of 22,23-dibromo-4-stigmasten-3-one and Δ⁴-3-keto sitosteroids, and (2) separating at least 22,23-dibromo-4-stigmasten-3-one from the mixture.

8. The process which comprises the steps of (1) brominating at below about twenty degrees centigrade a steroid mixture consisting essentially of stigmastadienone and sitostenone with more than a molar equivalent of bromine, calculated on the stigmastadienone, in the presence of pyridine, to produce a steroid mixture consisting essentially of 22,23-dibromo-4-stigmatsen-3-one and Δ⁴-3-keto sitosteroids, and (2) separating 22,23-dibromo-4-stigmasten-3-one from the mixture.

9. The process of claim 8 wherein the bromination is conducted at between about minus ten and about plus ten degrees centigrade with more than one molar equivalent of bromine, calculated on the stigmastadienone.

10. The process which comprises the steps of (1) oxidizing a mixture of stigmasterol and sitosterol to produce a steroid mixture consisting essentially of stigmastadienone and sitostenone, (2) brominating the resulting steroid mixture with at least a molar equivalent of bromine, calculated on the stigmastadienone, in the presence of a compound selected from the group consisting of pyridine and alkylpyridines, to produce a steroid mixture consisting essentially of 22,23-dibromo-4-stigmasten-3-one and sitostenone, (3) separating at least 22,23-dibromo-4-stigmasten-3-one from the bromination mixture, and (4) dehalogenating the separated 22,23-dibromo-4-stigmasten-3-one to produce stigmastadienone.

11. The process which comprises the steps of (1) oxidizing a mixture of stigmasterol and sitosterol to produce a steroid mixture consisting essentially of stigmastadienone and sitostenone, (2) brominating the resulting steroid mixture with more than a molar equivalent of bromine, calculated on the stigmastadienone, in the presence of pyridine, to produce a steroid mixture consisting essentially of 22,23-dibromo-4-stigmasten-3-one and sitostenone, (3) separating at least 22,23-dibromo-4-stigmasten-3-one from the mixture, and (4) dehalogenating the separated 22,23-dibromo-4-stigmasten-3-one to produce stigmastadienone.

12. The process of claim 11 wherein the bromination is conducted employing between about 1.3 and about 1.7 molar equivalents of bromine, calculated on the stigmastadienone, at between about minus ten and about plus ten degrees centigrade.

13. The process of claim 11 wherein the oxidation of step 1 is an Oppenauer oxidation and the dehalogenation of step 4 is achieved with zinc and acetic acid.

References Cited in the file of this patent

UNITED STATES PATENTS

| | | |
|---|---|---|
| 2,203,611 | Bockmuhl | June 4, 1940 |
| 2,227,839 | Marker | Jan. 7, 1941 |
| 2,319,808 | Fernholz | May 25, 1943 |
| 2,578,734 | Ott | Dec. 18, 1951 |

FOREIGN PATENTS

| | | |
|---|---|---|
| 637,530 | Germany | Oct. 30, 1936 |